March 2, 1965

R. C. BAENZIGER 3,171,609

REEL FOR FISHING

Filed Nov. 13, 1961

INVENTOR.
ROBERT C. BAENZIGER
BY
Woodhams, Blanchard & Flynn
ATTORNEYS

March 2, 1965 R. C. BAENZIGER 3,171,609
REEL FOR FISHING
Filed Nov. 13, 1961 5 Sheets-Sheet 2 fig. 5 fig. 7 fig. 6 fig. 8 fig. 11 fig. 10

INVENTOR.

BY Woodhams, Blanchard & Flynn
ATTORNEYS

March 2, 1965

R. C. BAENZIGER 3,171,609

REEL FOR FISHING

Filed Nov. 13, 1961

INVENTOR.
ROBERT C. BAENZIGER
BY
Woodhams, Blanchard and Flynn
ATTORNEYS

March 2, 1965 R. C. BAENZIGER 3,171,609
REEL FOR FISHING

Filed Nov. 13, 1961 5 Sheets-Sheet 5

INVENTOR.
ROBERT C. BAENZIGER
BY
Woodhams, Blanchard & Flynn
ATTORNEYS

United States Patent Office 3,171,609
Patented Mar. 2, 1965

3,171,609
REEL FOR FISHING
Robert C. Baenziger, 2145 Oak Ave., Northbrook, Ill.
Filed Nov. 13, 1961, Ser. No. 151,867
8 Claims. (Cl. 242—84.44)

This invention relates in general to a fishing reel and, more particularly, to a type thereof which is constructed so that it avoids many of the problems, such as backlash, which have usually been encountered by fishermen using conventional reels. Moreover, the reel described hereinafter is intended to be less complicated, easier to operate, and less expensive to manufacture than the fishing reel which was designed for a similar purpose and is disclosed in my co-pending patent application, Serial No. 19,803, filed April 4, 1960, and now Patent No. 3,111,287.

As set forth at length in my above-mentioned, co-pending application, many attempts have been made to provide fishing reels having one or more of the features contained in my improved reel. In fact, the reel structure disclosed in said co-pending application contains many of the features which are essential in a fishing reel capable of a satisfactory casting operation. Those features which are believed to be particularly important in a satisfactory casting reel are as follows:

(1) A compact structure which is light in weight, sturdy in construction and can be used for many years with a minimum of maintenance.

(2) A clutch mechanism for releasing the spool so that it can rotate freely within its shaft-supporting bearings independently of the drive mechanism therefor and/or the level wind mechanism associated therewith.

(3) A level wind mechanism, including a line guide, which is inactivated during the casting operation, but which is positioned so that it does not materially affect, adversely or otherwise, the movement of the line from the spool during an unwinding or casting operation.

(4) A brake mechanism associated with the spool for adjustably controlling the rotational speed of the spool when it is otherwise freely rotatable during a casting operation, said mechanism preferably being arranged so that the braking action thereafter applied by said mechanism increases in force as the speed of rotation increases, regardless of the initial amount of such braking action, whereby backlash, due to overrunning of the spool during an unwinding rotation thereof, is substantially prevented.

(5) A click mechanism for indicating that the line is being unwound from the spool, when the clutch is engaged and, therefore, the spool is not rotating freely.

(6) An adjustable drag mechanism which can apply a variable amount of resistance to the rotational movement of the spool in an unwinding direction when it is not in the freely rotating condition.

Although the desirability of a reel having all or substantially all of the above-listed features has long been recognized, such a reel construction has heretofore been achieved only by providing a great many parts and a substantial number of relatively complex subassemblies which have not only made such reels difficult to disassemble for the purpose of cleaning, but have also made them expensive to manufacture and difficult to maintain.

While much effort has been expended in the past, little success has been achieved, insofar as I am aware, in developing a reel construction embodying the above-listed features and, at the same time, being particularly designed for economical and relatively simple construction, and for relatively easy disassembly by the fisherman for the purpose of periodic cleaning. Moreover, this type of reel construction has not been previously designed successfully so that it could be easily and quickly converted from a reel of the type commonly used in salt water fishing to a reel of the type commonly used in streams or small lakes.

More specifically, fishermen who use a casting reel for fishing in relatively small bodies of water, such as streams, usually prefer a reel in which the spool driving crank can be positively connected to the spool so that rotation of the spool in an unwinding direction can be positively and manually stopped by the fisherman. Thus, the fisherman can, by manually engaging the crank when it is clutched to the spool, positively stop the movement of the fish, which he has hooked, away from the rod. However, fishermen who fish in large bodies of water often prefer to have a reel which can be adjusted to apply a heavy drag to the spool as it is rotating in the unwinding direction without actually stopping the movement of the line. Thus, the hand crank should be mounted so that it does not turn the reel when a fish is running with the line. From a manufacturer's standpoint, it is highly desirable to provide a basic reel construction which can be converted with only minor modifications from one to the other of these two reel constructions.

Accordingly, a primary object of this invention has been the provision of an improved reel construction which embodies all of the above-listed features and which is designed particularly for use in bait casing, but which is also useful in a variety of other fishing situations and in combination with a casting rod, a fly rod or other pole.

A further object of this invention has been the provision of a fishing reel, as aforesaid, which has been especially, carefully and scientifically designed so that it can be manufactured and assembled with a minimum of cost commensurate with: durability, foolproof operation, minimum maintenance, complete reliability in all fishing situations in which reels of this type are normally used, and ease of disassembly for the purpose of cleaning by a fisherman who is relatively unskilled in technical devices.

A further object of this invention has been the provision of a fishing reel, as aforesaid, which is light in weight, pleasing in appearance, compact in size and is economically competitive with conventional fishing reels having far less features.

A further object of this invention has been the provision of a reel construction, as aforesaid, which can be very nearly completed without being limited by the specific structural details which are peculiar to either the deep-sea fishing reel or the stream fishing reel, and which can be easily completed by adding one of two components to the basic subassembly to provide one or the other of said reel types.

Other objects and purposes of this invention will become apparent to persons familiar with this type of equipment upon reading the following specification and examining the accompanying drawings in which.

Figures 1, 2, 3, 4:
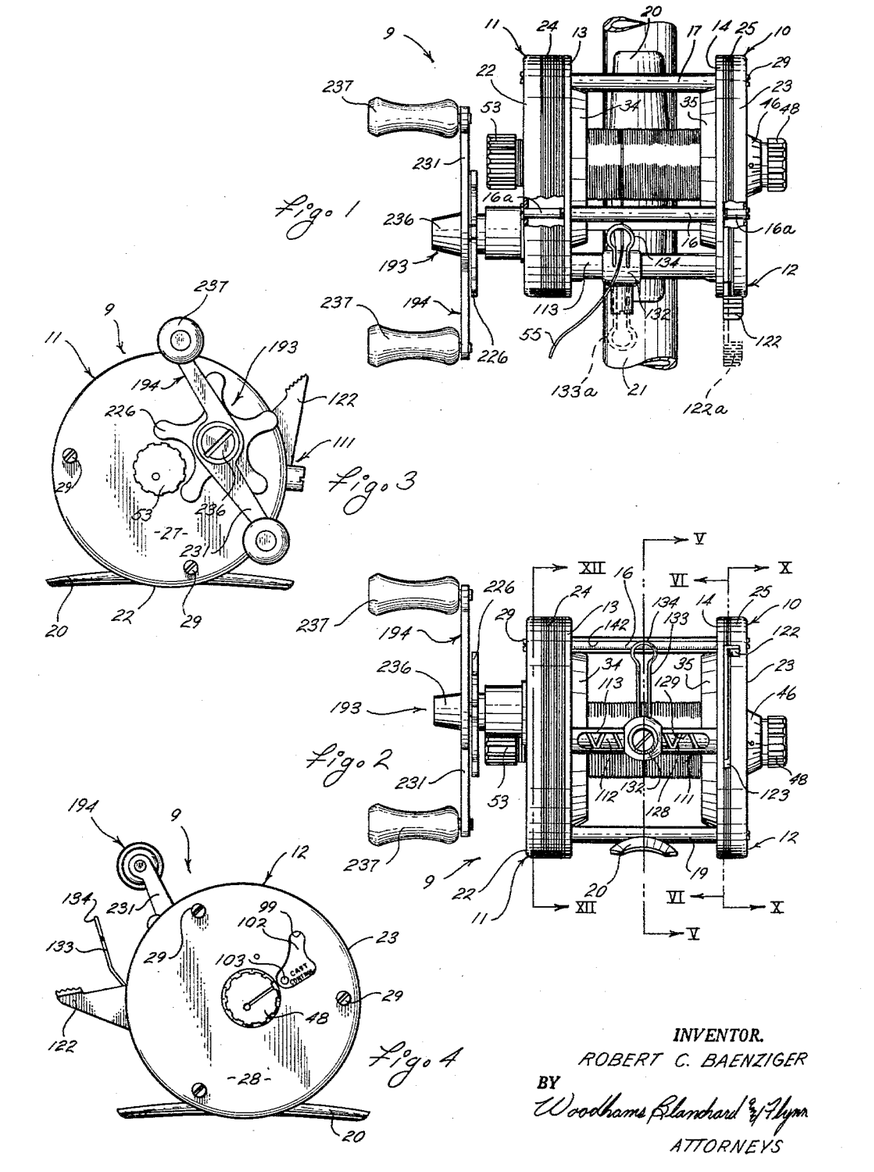
FIGURE 1 is a top-plan view of a reel construction embodying the invention as applied to a reel for deep-sea fishing.
FIGURE 2 is a front elevational view of said reel construction.
FIGURE 3 is an end elevational view of said reel construction as appearing from the driving end thereof.
FIGURE 4 is an end elevational view of said reel construction as appearing from the brake end thereof.

For convenience in description, the terms "upper," "lower," "front," "rear" and words of similar import will have reference to a reel construction embodying the invention as appearing in FIGURE 2, which illustrates a front view of the reel. The terms "drive side" and "brake side" shall have reference, respectively, to the left and right sides of the reel construction as appearing in FIGURES 1, 2, 9 and 13. The terms "inner," "outer" and derivatives thereof will have reference to the geometric center of said reel construction and parts thereof.

GENERAL DESCRIPTION

The objects and purposes of the invention, including those set forth above, have been met by providing a fishing reel having a pair of spaced, coaxial end housings which contain the various subassemblies and components required to carry out the functions of the reel, and which are rigidly connected to each other by a plurality of bars. A spool is rotatably supported upon and between the end housings and is connected by a clutch to a drive mechanism for positively rotating the spool in a winding direction. The clutch is operated by a shift mechanism which is also operatively connected to the level wind mechanism. The shift mechanism is operated by rotating the line guide of the level wind mechanism around an axis parallel with the spool. Said drive mechanism is disconnected from the spool when the line guide is rotated away from the spool. The level wind mechanism is connected with the shift mechanism in such a way that the normal operation of the level wind mechanism is stopped when the drive mechanism is disconnected from the spool.

A combined click and lock mechanism is provided for preventing rotation of the crank handle of the drive mechanism in the direction which would effect an unwinding rotation of the spool. Said drive mechanism is equipped with an adjustable, friction clutch which applies drag to the rotation of the spool in an unwinding direction when the driving clutch is engaged. An adjustable brake mechanism is provided to retard the rotation of the spool when it is disconnected from the spool drive mechanism.

DETAILED CONSTRUCTION

For convenience in disclosure, the structure of the reel 9 will be described in terms of its subassemblies or component parts which will be identified by the following subtitles: (1) frame structure and spool, (2) brake assembly, (3) level wind mechanism, (4) shift and clutch assembly, (5) drive mechanism, and (6) click and lock mechanism.

(1) *Frame structure and spool*

The fishing reel 9 (FIGURES 1 to 4 and 13, inclusive) illustrates a preferred embodiment of the invention, which is comprised of a frame assembly 10 including a drive housing 11 and a brake housing 12 which are circular, coaxial and spaced from each other. The opposing end plates 13 and 14 (FIGURE 13) of the housings 11 and 12, respectively, are rigidly held with respect to each other by a plurality, here four, of connecting bars 16, 17, 18 and 19 which are rigidly secured near their ends, as by welding, to the end plates 13 and 14. The top bar 16, rear bar 17 and the front, bottom bar 19 have portions 16a, 17a and 19a, respectively, of reduced diameter at both ends thereof, which portions extend through and beyond said end plates 13 and 14 and have coaxial, threaded openings therein. The frame assembly 10 includes an elongated mounting plate 20 (FIGURES 1 and 2) which is rigidly secured to the lower sides, and extends transversely, of the bottom bars 18 and 19. The lower surface of the plate 20 is concave and transversely arcuate to engage a fishing rod or pole 21 in a conventional manner.

The housings 11 and 12 (FIGURE 13) include cup-shaped circular end caps 22 and 23 having peripheral walls 24 and 25, and axial end walls 27 and 28, respectively. As shown in FIGURE 1 with respect to the top bar 16, the said end portions of the bars 16, 17 and 19 extend into appropriate openings in the end walls 27 and 28 and are flush with the outer surfaces thereof when the free edges of the peripheral walls 24 and 25 are snugly against the end plates 13 and 14, respectively. Screws 29, which are received into the threaded openings in the end portions 16a, 17a and 19a, hold the end caps 22 and 23 against the end plates 13 and 14.

The end plates 13 and 14 (FIGURE 13) have coaxial, circular openings 32 and 33 which are similarly eccentric with respect to their respective end plates. The annular members 34 and 35 have cylindrical flanges 37 and 38, which are snugly disposed within and secured to the edges of the plates 13 and 14 defining the openings 32 and 33 therethrough. Said members 34 and 35 have peripheral surfaces which converge from said plates 13 and 14 toward the center of the reel structure, thereby acting as line guides, and which encircle the axial end disks 57 and 58 of the spool 56.

A pair of coaxial sleeve bearings 41 and 42 (FIGURE 13) are mounted upon the end walls 27 and 28, respectively, by means of the externally threaded collars 52 and 46, respectively. Said bearings 41 and 42 are arranged so that the journal openings 43 and 44 therein are coaxial with the annular members 34 and 35. The collars 52 and 46 project outwardly from the walls 27 and 28. The collar 46, which has an outwardly opening, annular groove 47, is threadedly engaged by an internally threaded end cap 48. Resilient means, such as a spiral spring 49, is disposed within the groove 47 for compression between the collar 46 and the adjacent edge of the end cap 48. The collar 52 is threadedly engaged by an end cap 53.

The spool 56 (FIGURES 9 and 13), upon which the line 55 is wound, has a coaxial shaft 59 which extends completely through and beyond the axial ends of said spool. Said shaft 59 may be rigidly held within the spool 56 by a pin 62 which extends radially through the spool 56 and the shaft 59. The shaft 59 has an externally threaded portion 63 externally of and adjacent to the end disk 58.

(2) Brake assembly

The brake assembly 66 (FIGURES 6, 7, 8, 9 and 11), which operates like a centrifugal governor, includes a retaining disk 67 having an axially offset, central portion 68 which is snugly disposed against the end disk 58 on the spool 56 and coaxially encircles the shaft 59. The peripheral portion 69 of said disk 67 is spaced axially from the end disk 58 to define a radially outwardly opening, annular groove 72 between the disks 58 and 67. The retaining disk 67 has four openings 73 (FIGURE 8) in the annular portion 74 of the disk 67 which extends between the central and peripheral portions of said disk 67 and defines the bottom of the groove 72. The relative locations of the openings 73 are carefully selected in the manner and for reasons appearing hereinafter.

Figure 11:
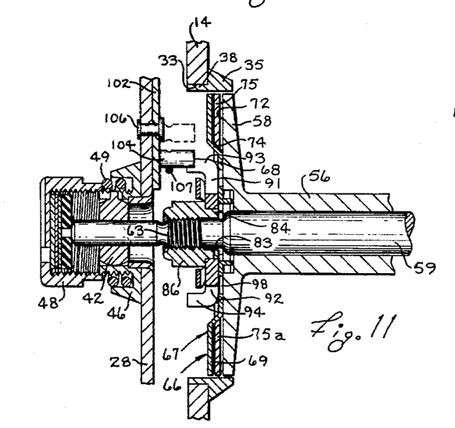
FIGURE 11 is a sectional view substantially as taken along the line XI—XI in FIGURE 10.

Four L-shaped brake members 75, 75a, 76 and 76a (FIGURE 7) are each pivotally supported by a pin 77 within the groove 72 so that the actuating leg 78 on each brake member extends inwardly through one of the openings 73. Each of the brake members 75, 75a, 76 and 76a has an integral brake or drag leg 79, as shown on brake members 75 and 76a, which leg is movable between an inoperative position completely within the annular groove 72 and an operating position where its free end projects radially beyond the peripheral edges of the disks 58 and 67 for engagement with the inner surface of the annular members 35 (FIGURE 11). The versatility of the brake assembly 66 can be increased by providing the diametrically opposed brake members 75 and 75a with drag legs 79 which are somewhat larger and heavier than the drag legs on the other two brake members 76 and 76a.

A brake control 82 (FIGURES 7 and 8) is provided adjacent the disk 67 to effect variations in the braking action. More specifically, the brake control 82 is a substantially flat plate having a central opening 83 which snugly and rotatably encircles the reduced circular end portion 84 on the retaining nut 86 (FIGURES 9 and 11) which engages the threaded portion 63 for holding the retaining disk 67 tightly against the spool 56. The control 82 (FIGURE 8) has a pair of diametrically disposed lobes 87 and 88 which are simultaneously engageable with the actuating legs 78 on two diametrically disposed brake members 75 and 75a, for moving said brake members into their inoperative positions. Said control 82 also has a pair of radially extending fingers 91 and 92 which are simultaneously engageable with the actuating legs 78 on the diametrically disposed brake members 76 and 76a, for holding said brake members in their inoperative positions. The fingers 91 and 92 have axially extending end portions 93 and 94 which are utilized to effect rotation of the brake control 82 around the axis of the shaft 59 in a manner discussed hereinafter.

The lobes 87 and 88 (FIGURES 7 and 8) and the fingers 91 and 92 are located with respect to each other so that they can engage the brake members 75, 75a, 76 and 76a in a variety of arrangements, which produce different braking forces. For example, when the control 82 is in its FIGURE 6 position, none of the brake members are engaged thereby so that all four drag legs 79 can move by centrifugal force into their operative positions against the annular member 35 when the spool 56 is rotated. With the control 82 in its FIGURE 7 position, the brake members 76 and 76a are engaged by the lobes 87 and 88, whereby they are held in inoperative positions while the brake members 75 and 75a are free to move into braking positions. By rotating the control 82 one step in a counterclockwise direction from its FIGURE 7 position, the brake members 75 and 75a are engaged by the lobes 88 and 87, respectively, and thereby held in the inoperative positions, and the brake members 76 and 76a are accordingly disengaged from the lobes 87 and 88 so that they can move into their braking positions. With the control 82 on its FIGURE 8 position all four of the brake members are held in their inoperative positions.

The control 82 (FIGURE 7) has a pair of arcuate, resiliently flexible, detent elements 96 and 97 which are secured near one end of each to said control 82 on diametrically opposite sides of the central opening 83 so that the free ends of said detent elements are engageable with the central portions 68 of the retaining disk 67. Said central portion 68 has a plurality of detent openings 98 into which the free ends of said detent elements 96 and 97 are receivable to releasably resist counterclockwise rotation of the control 82, as appearing in FIGURE 7, and prevent rotation of said control 82 in the clockwise direction. The detent openings 98 are preferably arranged so that the control 82 is in a predetermined position of control (including no control) over the brake members 75, 75a, 76 and 76a whenever the detent elements are seated in detent openings 98.

Figure 8:
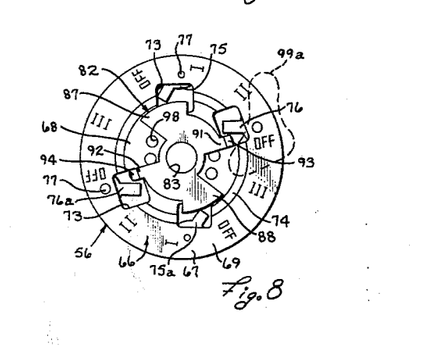
FIGURE 8 is a further, enlarged fragment of FIGURE 6 showing the spool with parts thereof removed or in different positions.
Figure 9:
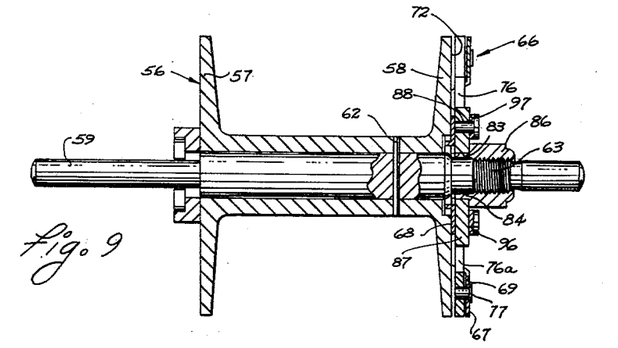
FIGURE 9 is a sectional view taken along the line IX—IX in FIGURE 7 and rotated approximately 90° in a counterclockwise direction.
Figure 10:
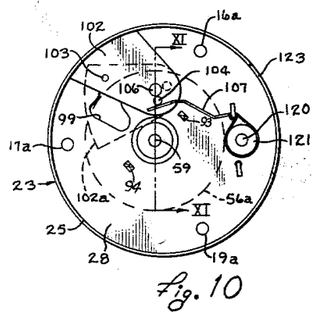
FIGURE 10 is a sectional view substantially as taken along the line X—X in FIGURE 2.

As shown in FIGURES 4 and 10, the end wall 28 of the brake housing 12 has an irregular, access opening 99 which, as indicated by the broken line indication 99a in FIGURE 8, exposes the peripheral portion 69 of the disk 67. The opening 99 (FIGURE 10) is selectively covered by a cover plate 102 which is pivotally supported by the pin 106 upon and adjacent the inner surface of the end wall 28 at a point directly above the bearing 42. The plate 102 has thereon a control pin 103 (FIGURE 4) which extends through the opening 99 and which is manually engageable for moving the cover plate 102 between the closed position and the open position shown in FIGURE 10.

Said cover plate 102 (FIGURE 10) also has an actuating pin 104 extending from its inner side adjacent the pivot pin 106. The actuating pin 104 is engaged by one end of a spring 107 which is mounted near its other end upon the end wall 28 at a point spaced substantially from the opening 99. The actuating pin 104 is so located with respect to the pivot pin 106 that the spring 107 tends by its engagement with the actuating pin 104 to hold the cover plate 102 in its open position of FIGURE 10, after the cover plate has been moved into said open position, but also tends to hold the cover plate 102 in its closed position 102a after said plate has been moved into that position.

The actuating pin 104 on the cover plate 102 is located so that it is in the rotational path of the end portions 93 and 94 of the fingers 91 and 92 when the cover plate 102 is in its open position of FIGURE 10. Accordingly, rotation of the spool 56, which is indicated in broken lines at 56a in FIGURE 10, in either direction when the cover plate 102 is in the open position will cause the nearest one of the end portions 93 and 94 to engage the actuating pin 104. If the spool 56a (FIGURE 10) is rotated in the counterclockwise direction, the engagement of the pin 104 by one of the end portions 93 and 94 will hold the brake control 82 against rotational movement with the spool. Thus, the operator of the reel 9 is able to change the amount of drag applied by the brake assembly 66 simply by rotating the spool 56a (FIGURE 10) in the winding or counterclockwise direction. When the spool 56a is rotated in the unwinding or clockwise direction, the actuating pin 104 is engaged by the nearest one of the end portions 93 or 94 and the cover plate 102 is thereby automatically pivoted into its closed, broken line position 102a.

Figure 6:
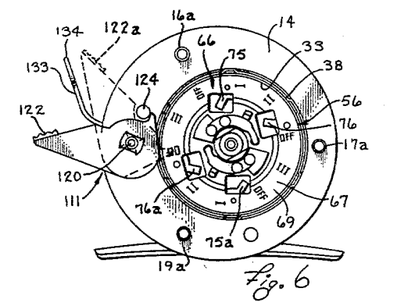
FIGURE 6 is a sectional view taken along the line VI—VI in FIGURE 2.
Figure 7:
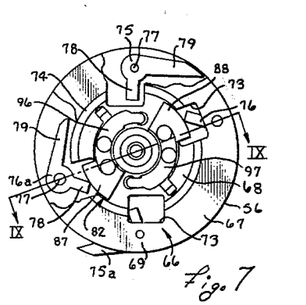
FIGURE 7 is an enlarged, broken fragment of the structure appearing in FIGURE 6, and particularly showing the axial end of the spool.

Indicia (FIGURE 8), such as numerical designations and/or words, are placed upon the peripheral portion 69 of the retaining disk 67 so that they can be viewed through the access opening 99 when the cover plate 102 is in the open position. These designations are located so that they appear, one at a time, in the access opening 99 when the brake control 82 is in one of its several detent positions, some of which are shown in FIGURES 6, 7 and 8.

Figure 5:
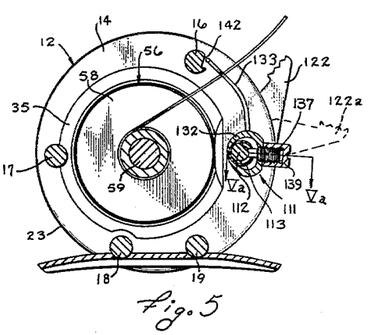
FIGURE 5 is a sectional view taken along the line V—V in FIGURE 2.
Figures 5A, 13:
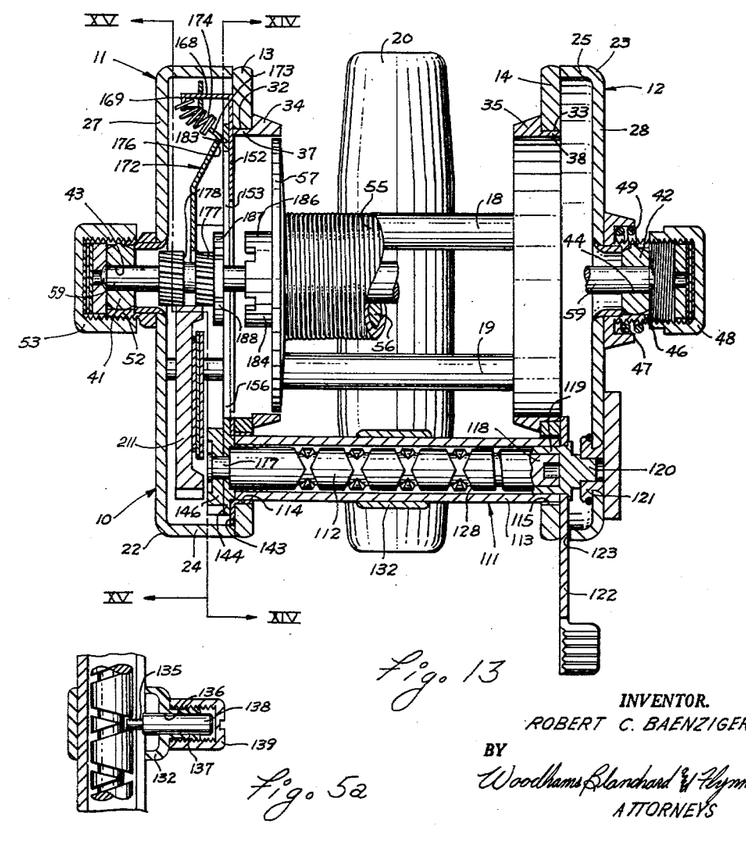
FIGURE 5A is a sectional view taken along the line VA—VA in FIGURE 5.
FIGURE 13 is a sectional view substantially as taken along the line XIII—XIII in FIGURE 12.

The drag or braking action effected by the brake assembly 66 can be augumented by compressive pressure applied in an axial direction to the opposite ends of the shaft 59 by the end caps 48 and 53 (FIGURES 11 and 13). Ordinarily, the end cap 53 is snugly mounted upon the collar 52 in a substantially permanent position and this axial compression is adjusted by rotating the end cap 48 with respect to the collar 46.

(3) Level Wind Mechanism

The reel 9 includes a level wind mechanism 111 comprised of a shaft 112 rotatably disposed within a sleeve 113 which extends between and into the openings 114 and 115 (FIGURE 13) in the end plates 13 and 14, respectively. The shaft 112 has end portions 117 and 118 of reduced diameter. The left end portion 117 (FIGURE 13) extends beyond the corresponding end of the sleeve 113 and into the drive housing 11. The right end portion 118 is rotatably journaled in a bearing member 119 which is mounted upon, and held against rotation with respect to, the rightward end of the sleeve 113. Said bearing member 119 has a coaxial stub shaft 120, which extends therefrom coaxially with the shaft 112 for rotatable reception into a bearing 121 mounted upon the end wall 28 of the brake housing.

A manually operable lever 122 (FIGURE 13) is rigidly secured to the bearing member 119 and extends radially therefrom through a peripherally elongated slot 123 in the peripheral wall 25 of the brake housing 12 adjacent the end plate 14 thereof. Accordingly, the shaft 112 is free to rotate independently of the sleeve 113. Also, the bearing member 119, the sleeve 113 and the lever 122 can be pivoted together and with respect to the shaft 112 around the rotational axis thereof. A stop pin 124 is secured to, and extends from the outer surface of, the end plate 14 adjacent the lever 122 for engagement by portions of said lever to limit the pivotal movement thereof between the solid line and broken line positions (FIGURE 6) thereof.

The shaft 112 has a helical groove 128, which is conventional in level wind mechanisms, and the sleeve 113 has a lengthwise opening 129 in the side wall thereof which exposes one side of the shaft 112 throughout the length of said groove. A collar 132 is rotatably and axially slidably supported upon the sleeve 113, and an elongated, substantially U-shaped line guide 133 is mounted upon said collar 132 so that it extends substantially radially away from the sleeve 113. The outer end of the line guide 133 has an enlarged, substantially circular portion 134.

The collar 132 (FIGURE 5) has a radially disposed opening 136 which is preferably spaced approximately 90° from the line guide 133 around the peripheral surface of the collar. An externally threaded sleeve 137 (FIGURE 5A) is secured to the collar 132 and is coaxial with the opening 136 therein. A pin 138, which is slidably received into the seleeve 127, has an inner tip 135 which extends into the helical groove 128. A cap 139 is threadedly mounted upon the guide sleeve 137 for holding the pin 138 within said sleeve and the tip 135 in engagement with the walls defining the groove 128.

Accordingly, as will be seen from the disclosure in FIGURES 2, 5 and 5A, the collar 132 and the line guide 133 thereon are reciprocated lengthwise of the sleeve 113 by rotation of the shaft 112 in a substantially conventional manner. Also, the collar 132 and guide 133 are pivoted between the solid and broken line positions thereof shown in FIGURE 5 when the sleeve 113 is pivoted around the shaft 112 by the lever 122. The top connecting bar 16 (FIGURES 2 and 5) has a frontwardly opening, lengthwise groove 142 for receiving and guiding the upper edge of the line guide 133 when said line guide is in its substantially upright position wherein it can perform its reciprocating, level wind function.

The leftward end of the sleeve 113 (FIGURE 13) is journaled in a bearing 143 which is rigidly held within the sleeve opening 114 in the end plate 13. A flat cam arm 144 is disposed within the drive housing 11 adjacent the end plate 13, and is rigidly secured to the leftward end of the sleeve 113, which extends slightly beyond the bearing 143 into the drive housing 11. A pinion 146 is rigidly secured to the left end portion 117 of the shaft 112 adjacent the cam arm 144 and within the drive housing 11. The cam arm 144 and pinion 146, although connected to the level wind mechanism 111, are operably associated with the shift mechanism 151 disclosed in FIGURES 12, 13 and 14 and discussed in detail hereinafter.

(4) Shift and clutch assembly

Figures 12, 14, 15, 16, 18:
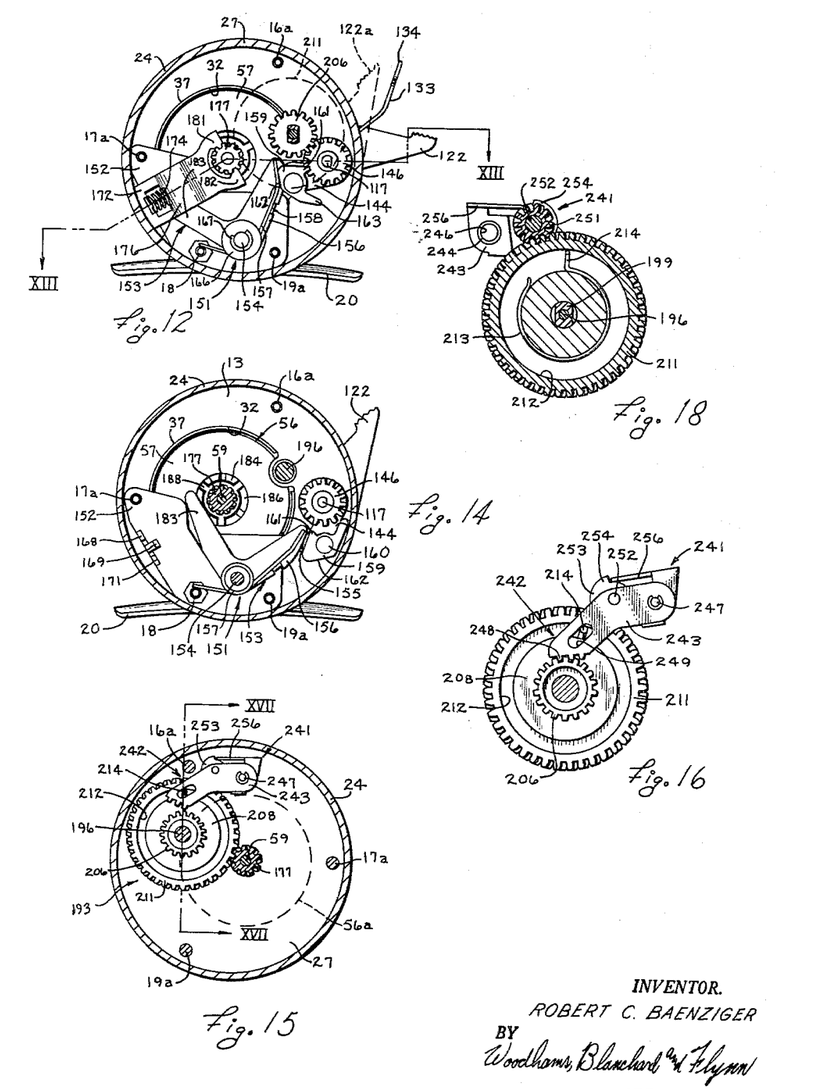
FIGURE 12 is a sectional view taken along the line XII—XII in FIGURE 2.
FIGURE 14 is a sectional view substantially as taken along the line XIV—XIV in FIGURE 13.
FIGURE 15 is a sectional view substantially as taken along the line XV—XV in FIGURE 13.
FIGURE 16 is an enlarged fragment of FIGURE 15 with parts thereof in different positions of operation.
FIGURE 18 is a sectional view taken along the line XVIII—XVIII in FIGURE 17.

As shown in FIGURES 12, 13 and 14, the shift mechanismf 151 includes a mounting plate 152 which is rigidly secured upon the outer surface of the end plate 13 and partially blocks the opening 32 therein. A V-shaped shift crank 153 (FIGURE 12) is pivotally supported upon the outer surface of the mounting plate 152 by a pivot pin 154 which slidably extends through the crank 153 near the apex thereof and is rigidly secured to the plate 152 approximately midway between the adjacent ends of the bottom connecting bars 18 and 19. The front arm 156 (FIGURE 14) of the crank 153 is engageable by the cam edge 155 of the cam arm 144 for movement of said front arm toward the rotational axis of the spool 56.

An elongated spring 157 (FIGURE 14), which encircles the pivot pin 154, has a pair of end portions which extend radially away from said pin 154. One end portion of spring 157 is braced against the upper surface of the rear bottom connecting bar 18. The other end portion of the spring 157 bears, at a point spaced substantially from its free end, against the inner side of an ear 158 extending away from the arm 156, whereby said spring continuously urges the front arm 156 against the cam arm 144. Since the cam arm 144 is rigidly connected to the sleeve 113, as described above, the spring 157 also has the effect of continuously urging the line guide 133 into its upright, traversing position of FIGURE 5. The cam edge on the cam arm 144 is so constructed that it will hold the front arm 156 in its FIGURE 12 position in spite of the contrary urging of the spring 157, thereby holding the line guide 133 in its extended or non-traversing position.

A locking pawl 159 is pivotaly supported by the pin 160 upon the outer surface of the cam arm 144 near its free end. Said pawl 159 has a lock tooth 161 engageable between a pair of teeth on the pinion 146 for positively opposing rotation of said pinion 146 in a counterclockwise direction, as appearing in FIGURE 12, with respect to said arm 144. Thus, the pawl 159 can prevent that rotation of the pinion 146 which is required to traverse the line guide 133 lengthwise of the shaft 112 during a winding rotation of the spool 56 (FIGURE 12). The pawl 159 has an edge surface 162 engageable with the adjacent end portion of the spring 157, whereby said tooth 161 is resiliently urged into engagement with the pinion 146, when the arm 144 is in its FIGURE 12 position. Said pawl 159 also has a stop arm 163 which is engageable with the cam arm 144 for limiting rotational movement of the pawl 159 in a clockwise direction around the pin 160. The spring 157 and crank 153 are held on the pivot pin 154 by a washer 166 and spring clip 167.

A shift fork bracket 168 (FIGURE 13) is secured to, and projects outwardly from, the mounting plate 152 at the rearward edge thereof. A finger 169 extends inwardly and downwardly from the bracket 168 which has shoulders 171 (FIGURE 14) midway between its inner and outer ends for reasons appearing hereinafter.

A shift fork 172 (FIGURE 12) has an opening therethrough near one end into which the outer end of the shift fork bracket 168 is slidably receivable so that the adjacent end of the shift fork can rest upon the shoulders 171. The shift fork 172 has an integral finger 173 which extends toward but is spaced from the finger 169 on the bracket 168 when the fork 172 is mounted upon the bracket 168 and is extending inwardly therefrom toward the rotational axis of the spool 56. A coil spring 174 encircles the fingers 169 and 173 and is constantly held under compression between the bracket 168 and the fork 172, thereby urging said fork 172 against or toward the mounting 152. As shown in FIGURE 13, the shift fork 172 has an inwardly offset portion 176 which slopes gradually toward the inner end of the fork and is engageable with the plate 152. An axially elongated gear 177 (FIGURE 13) has an annular groove 178 between the axial ends thereof into which the prongs 181 and 182 (FIGURE 12) on the fork 172 are snugly received for rotatably supporting the gear 177.

The V-shaped shift crank 153 (FIGURE 14) has a rear arm 183 which extends radially from the pivot pin 154 between the bracket 168 and the gear 177. The rear arm 183 is movable in response to pivotal movement of the cam arm 144 between a position adjacent the gear 177, as appearing in FIGURE 14, and a position between the offset 176 in the shift fork 172 and the adjacent portion of the mounting plate 152, as appearing in FIGURE 12. When the rear arm 183 is in its FIGURE 12 position, the shift fork 172 is urged by the rear arm 183 axially away from the spool 56 for reasons appearing hereinafter. The gear 177 is moved axially by the shift fork 172 along the shaft 59 upon which it is rotatably supported for such axial movement. The outer or rearward edge of the rear arm 183 is bevelled inwardly and rearwardly to facilitate its movement under the offset 176 and thereby reduce wear during such movement.

A driven clutch member 184 (FIGURES 9, 13 and 14) is rigidly secured to the leftward end disk 57 on the spool 56 and has a plurality of axially extending clutch teeth 186 disposed in a concentric circle around the shaft 59. A driving clutch member 187 is coaxially secured to the axially inner end of the gear 177 and has radially extending clutch teeth 188 which are receivable into engagement with the clutch teeth 186 when the gear 177 is shifted into its axially inner position.

Accordingly, it will be seen that by movement of the lever 122 (FIGURE 12) into its solid line position, from its broken line position 122a, the line guide 133 is pivoted radially outwardly away from the spool 56 and, at the same time, the driving clutch member 187 is moved by the arm 144, the crank 153 and fork 172 out of engagement with the driven clutch member 184, and the pawl 159 is moved into engagement with the pinion 146. Thus, the spool 56 is disengaged from the gear 177 which drives it and the level wind mechanism 111 is locked against traversing movement thereby preparing the reel structure for a casting operation. That is, the spool 56 is free to rotate in an unwinding direction, subject to the amount of drag applied by the brake mechanism 66, and the line guide 133 is moved far enough away from the spool 56 so that the movement of the line 55 off of the spool and through the line guide 133 will not be materially impeded due to the slight bending imposed on the line as it is unwound from the end portions of the spool.

(5) Drive mechanism

Figure 17:
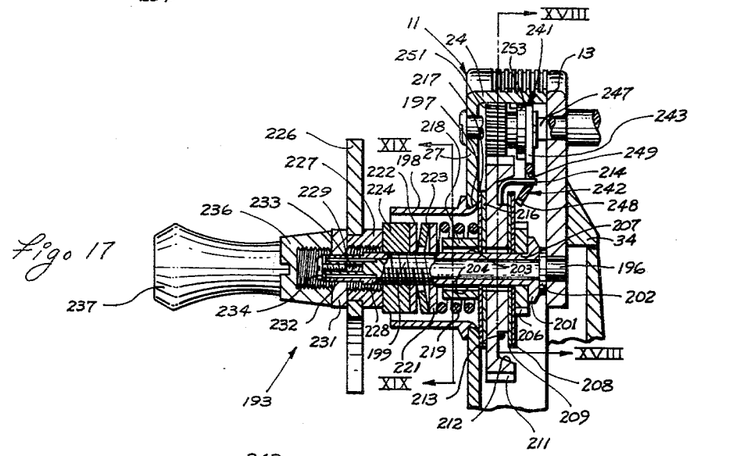
FIGURE 17 is a sectional view substantially as taken along the line XVII—XVII in FIGURE 15.

The drive mechanism 193 (FIGURES 1, 3, 15 and 17) includes a hand crank 194 which is connected by mechanism described in detail hereinafter to the gear 177 and to the pinion 146 for driving same. More specifically, a spindle 196 (FIGURES 14 and 17) is rigidly secured to the end plate 13 and extends outwardly therefrom in a direction parallel with the rotational axis of the spool 56 through a concentric opening 197 in the end wall 27 of the housing 11. A sleeve 198 has one end rigidly and concentrically secured within the opening 197 and projects axially outwardly therefrom, concentric with the spindle 196. A hollow shaft 199 is slidably and rotatably supported upon the spindle 196 and extends substantially coextensively with said spindle outwardly through the sleeve 198 on the end wall 27. Said shaft 199 has a radially outwardly extending flange 201 on its inner end adjacent the end plate 13 from which it is spaced slightly by an integral collar 202 on said spindle 196. The shaft 199 has a pair of diametrically disposed, flat surfaces 203 and 204 which extend lengthwise thereof for preventing relative rotation between said shaft and certain elements mounted upon said shaft.

A drive pinion 206 having an oblong central opening 207 (FIGURE 12) is slidably and nonrotatably sleeved upon the shaft 199 adjacent the flange 201. Said drive pinion 206 is continuously engaged with the driven pinion 146 on the shaft 112 of the level wind mechanism 111. A metallic backing disk 208 is sleeved upon the shaft 199 and is rotatable therewith adjacent the drive pinion 206. A clutch disk 209 (FIGURE 17), which may be fabricated from the type of fibrous material used in clutch plates, is rotatably sleeved upon the shaft 199 adjacent the backing disk 208. A large main gear 211 is rotatably sleeved upon the shaft 199 adjacent, and in sliding contact with, the clutch disk 209. Said main gear 211 has a coaxial annular groove 212 in the face thereof which is adjacent to, and partially covered by, the clutch disk 209. A circular spring element 213 is disposed within the groove 212 and has an integral finger 214 extending in an axial direction out of the groove beyond the adjacent face of the main gear.

A clutch disk 216 (FIGURE 17) is rotatably supported upon the drive shaft 199 and held thereagainst by a backing disk 217, said disks 216 and 217 preferably being substantially identical in material and size with disk 209 and 208, respectively. The drive pinion 206, main gear 211 and the disks 208, 209, 216 and 217 are disposed within the drive housing 11.

Figure 19:
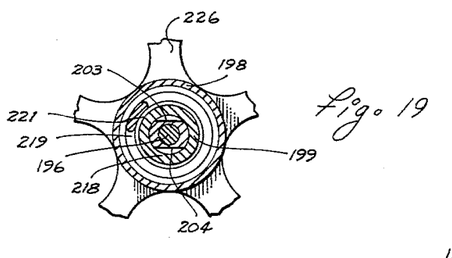
FIGURE 19 is a sectional view taken along the line XIX—XIX in FIGURE 17.

A spacing collar 218 (FIGURE 19) is rotatably and slidably supported upon drive shaft 199 adjacent the backing disk 217 (FIGURE 17) and is encircled by a spiral spring 219 which, in its uncompressed condition, is axially longer than the collar 218. Both the collar 218 and the spring 219 extend from the disk 217 into the sleeve 198. A pair of similar circular and metallic washers 221 and 222 are slidably but nonrotatably sleeved upon the drive shaft 199 with the washer 221 bearing against the outer end of the spring 219. A slightly curved or bent washer 223 is rotatably supported upon the drive shaft 199 between the flat washers 221 and 222. A ring 224, which is preferably fabricated from a somewhat compressible and flexible material, such as nylon, is snugly and nonrotatably supported on the drive shaft 199 adjacent the outer washer 222.

A star wheel 226 has an internally threaded hub 227 (FIGURE 17) which is threadedly mounted upon the outer, threaded end of the drive shaft 199 for urging the ring 224 toward the flange 201 on the drive shaft 199 and thereby compressing all elements therebetween. It will be seen that the main gear 211 can and will rotate with the drive shaft 199 as long as the force opposing such rotation does not exceed the compressive force applied by the star wheel 226 and the parts between said star wheel and the flange 201.

The flat surfaces 203 and 204 (FIGURE 17) on the drive shaft 199 are cut deeper near the outer end of the drive shaft to provide shoulders 228 adjacent the outer surface of the star wheel 226. The hand crank 194 has an opening 229 in the central portion of the crank bar 231 through which the end portion 232 of the drive shaft 199 slidably but nonrotatably extends, so that said bar bears against said shoulders 228. The outer end of the spindle 196 has a concentric, threaded opening 233 into which a screw 234 is threadedly received for holding the drive shaft 199 rotatably upon the spindle 196 adjacent the collar 202. The crank bar 231 is held against the shoulders 228 by an internally threaded cap 236 which threadedly engages the outer end of the shaft 199. The crank bar 231 has a pair of handles 237 rotatably supported thereon and extending in substantially the same direction from the opposite ends thereof.

It will be seen that, by rotating the star wheel 226 so that it moves inwardly toward the flange 201 on the drive shaft 199, the clutch disks 209 and 216 are pressed more firmly against the adjacent axial sides of the main gear 211 whereby the frictional engagement between said gear 211 and the clutch disks is increased. However, if a sufficiently strong torque is applied to the spool 56 while it is in gear and the crank 194 is held, the main gear 211 can rotate with respect to the drive shaft 199, even where the hand crank 194 is being rotated in a winding direction. This arrangement of the drive mechanism has been found to be particularly desired by persons who use this type of reel in deep-sea fishing or on larger bodies of water where large fish are often hooked and where no problem is involved if the fish runs with the bait for substantial distances. Although the fisherman cannot stop such running by holding the hand crank 194, he can tighten the star wheel 226 to a point where even a very large fish would soon be tired by opposing such resistance.

(6) *Click mechanism*

When a fish starts to run with the line 55 and thereby rotates the spool 56 (FIGURE 1) in its unwinding direction with the clutch members 184 and 187 (FIGURE 13) engaged, it is desirable to have an audible warning, such as the click mechanism 241 (FIGURES 15, 16, 17 and 18), which indicates to the fisherman that this action is occurring. The click mechanism 241 is embodied in and is part of a lock mechanism 242 which acts in this embodiment to prevent rotation of the hand crank 194 in a spool unwinding direction, except for a small initial movement which is sufficient to rotate the spool 56 (FIGURE 10) in a clockwise direction so that one of the finger portions 93 and 94 thereon will engage the actuating pin 104 and thereby close the cover plate 102 over the access opening 99. The way in which this small amount of movement is permitted will become apparent hereinafter.

The lock mechanism 242 (FIGURES 15, 16 and 18) includes a lock arm 243 which is rigidly secured near one end thereof to a pivot collar 244 having an opening 246 (FIGURE 18) through which a pivot pin 247 slidably and rotatably extends. The opposite ends of the pivot pin 247 are rotatably anchored in appropriate pivot openings in the plate 13 and the end wall 27 of the drive housing 11. The free end of the lock arm 243 has a plurality of integral teeth 248 which are engageable with the teeth on the drive pinion 206 (FIGURE 16). Said lock arm 243 has a lengthwise elongated opening 249 near the teeth 248 through which the finger 214 on the spring element 213 is slidably receivable. The opening 249 is of sufficient length to permit movement of the lock arm 243 with respect to the drive pinion 206 for engagement therewith or complete disengagement therefrom. The slope of the lengthwise axis of the opening 249 is arranged so that rotation of the main gear 211 in a counterclockwise direction (FIGURES 15 and 16), which effects a winding rotation of the spool 56, acts through the spring finger 214 to move the toothed end of the lock arm 243 out of engagement with the teeth on the drive pinion 206. This slope of the lengthwise walls defining the opening 249 accordingly is such that rotation of the main gear 211 in a clockwise direction as appearing in FIGURES 15 and 16 acts through the finger 214 to move the toothed end of the lock arm 243 downwardly into engagement with the drive pinion 206 whereby rotation thereof is promptly and positively stopped.

Referring now to the click mechanism 241 (FIGURE 18), a pinion 251 is rotatably supported upon the lock arm 243 between the collar 244 and the elongated opening 249 by means of the pin 252 so that it will engage the main gear 211 when the teeth 248 are in locking engagement with the teeth on the drive pinion 206. A ratchet wheel 253 is rigidly and coaxially secured to the pinion 251 adjacent the lock arm 243 and is also rotatable around the pin 252. The ratchet wheel 253 has a pair of diametrically disposed projections 254 extending radially from its periphery. A resiliently flexible, preferably, metallic, finger 256 is rigidly secured near one end thereof to the lock arm 243 so that the free end of said finger bears against the periphery of the ratchet wheel 253. The finger 256 and the projections 254 are arranged so that rotation of the pinion 251 by the main gear 211 in response to a rotation of the spool 56 in an unwinding direction will cause said finger 256 to make a snapping or clicking sound against the periphery of the ratchet wheel as the projections 254 move therebeneath. At this point, it will be recalled that the main gear 211 can rotate with respect to the drive pinion 206 in a clockwise direction, as appearing in FIGURES 15 and 16, even though the drive pinion 206 is held against such rotation by the lock arm 243. Such rotation of the pinion 251 and ratchet wheel 253 will occur when the drive mechanism 193 is connected by the clutch members 184 and 187 to the spool 56 and the line 55 is being unwound from the spool 56 by pulling it away from the spool.

(7) *Operation*

Under normal circumstances the operation of the above-described reel, when it is used in a casting operation, for example, will be about as follows. The fisherman first moves the lever 122 (FIGURE 12) from its broken line position 122a to its solid line position whereby the line guide 133 is moved away from the spool 56 and the shift mechanism 151 disengages the clutch members 184 and 187 so that the spool 56 may rotate as freely as possible during the casting operation. Such movement of the shift mechanism 151 will also cause the pawl 159 to lock the driven pinion 146 hence the shaft 112 against rotation so that the level wind mechanism 111 will be inoperative. The fisherman now casts with his fishing rod 20 (FIGURE 1), upon which the reel 9 has been previously mounted, and the line 55 will be unwound from the spool 56, in the expected manner, by the inertia of the bait (not shown) secured to the free end of the line. During the initial unwinding of the line 55 from the spool 56, centrifugal force will throw those drag members 76, which are not engaged by the drag control 82, radially outwardly against the annular flange or shoe 38 on the end plate 14. The drag which is thus developed prevents a backlash from occurring (when it usually does) during the relatively rapid deceleration in the rotational speed of the spool, which occurs shortly after the acceleration stops. Since the braking action produced by the drag members 76 is effected through centrifugal force, it will be apparent that such drag will increase as the rotational speed of the spool increases, thereby making it more effective to prevent overrunning of the spool which results in backlash.

As soon the bait strikes the water, the lever 122 can be mannually moved from its solid line position to its broken line position of FIGURE 12, whereby the level wind mechanism 111 is rendered operative and the shift mechanism 151 re-engages the clutch members 184 and 187 so that rotation of the hand crank 194 will result in a winding rotation of the spool 56. Alternatively, the fisherman can merely rotate the hand crank 194 in a clockwise direction, as appearing in FIGURE 3, whereby the drive pinion 206 (FIGURE 12) will cause the driven pinion 146 to rotate in a counterclockwise direction whereby the driven pinion 146 will be urged to rotate in a counterclockwise direction (FIGURE 12). Because of the engagement of the driven pinion 146 by the pawl 159, rotation of the pinion 146 will result in a corresponding counterclockwise rotation of the cam arm 144. As the cam arm 144 moves away from its FIGURE 12 position toward and into its FIGURE 14 position, the pawl 159 moves away from its engagement with the spring 157 and, therefore, is free to drop away from interference with the rotation of the driven pinion 146 with respect to the cam arm 144. Morever, the V-shaped shift crank 153 will be urged by the spring 157 to move in a clockwise direction (FIGURE 12) so that its rear arm 183 can move into a position adjacent the gear 177 where it permits the shift fork 172, under the urging of the spring 174, to re-engage the clutch members 184 and 187. Accordingly, rotation of the hand crank 194 in a clockwise direction (FIGURE 3) not only returns the level wind mechanism 111 into its operative traversable position, but also, through the shift mechanism 151, effects a connection between the spool 56 and the main gear 211, so that continued rotation of the hand crank will result in a winding rotation of the spool 56.

As long as the hand crank 194 (FIGURE 3) is being rotated in a clockwise winding direction, no substantial amount of resistance, other than that applied by the fish or the bait to the line, will be set up against such winding motion. However, if a fish suddenly takes the bait and starts to move away from the fisherman, thereby rotating the spool 56 in an unwinding direction, certain additional forces are immediately and automatically applied to the spool to resist such rotation, as long as the clutch members 184 and 187 are not disconnected from each other by a positive manual operation of the lever 122.

More specifically, when the spool 56 starts to rotate (FIGURE 15) in an unwinding or counterclockwise direction, this rotation is transmitted through the clutch members 184 and 187 (FIGURE 13), and the gear 177 to the main gear 211 which, accordingly, is rotated in a clockwise direction, as shown in FIGURE 15. This causes the lock arm 243 to move promptly into engagement with the drive pinion 206, as discussed above, and thereby prevents further rotation of the hand crank 194 (FIGURE 3) in a counterclockwise rotation. However, since the main gear 211 is rotatable with respect to the drive pinion 206 and the drive shaft 199, upon which they are both supported, the spool 56 can continue to rotate in an unwinding direction as long as the force effecting such unwinding movement of the spool overpowers the frictional force opposing the rotation of the main gear 211 with respect to the drive shaft 199. As state above, the amount of this frictional force can be varied by turning the star wheel 226 upon the drive shaft 199 to increase or decrease the compression of the main gear 211 between the clutch disks 209 and 216. The effect of this drag upon the unwinding movement of the spool can be increased by manually rotating the hand crank 194 in a clockwise or winding direction (FIGURE 3). Moreover, since the drive pinion 206 is directly and positively driven at all times by the hand crank 194 through the drive shaft 199, the effect achieved by the lock arm 243 in preventing unwinding rotation of the drive pinion 206 can also be accomplished by manually holding the hand crank 194 against rotation in an unwinding direction. However, the lock arm 243 does this automatically.

As soon as the lock arm 243 is moved downwardly into engagement with the drive pinion 206 due to the counterclockwise rotation (FIGURE 16) of the main gear 211, the click pinion 251 (FIGURE 18) is moved into engagement with the main gear 211 and rotated thereby in a clockwise direction, whereby the ratchet wheel 253 is moved therewith and the finger 256 is snapped over the projections 254 to produce a clicking sound. This clicking action also imposes a further drag upon the counterclockwise or unwinding rotation of the main gear 211, as shown in FIGURE 16.

After the fish ceases to pull the line away from the spool under this dragging condition, the fisherman can immediately wind the line upon the spool by rotating the hand crank 194 in a clockwise direction (FIGURE 3.)

If it becomes desirable to increase the braking action produced by the brake mechanism 66, such can be easily and quickly accomplished by manually engaging the control pin 103 on the cover plate 102 (FIGURE 4) and moving same upwardly so that the peripheral portion 69 of the retaining disk 67 can be viewed through the access opening 99 in the end wall 28. The hand crank 194 (FIGURE 3) is then rotated in a clockwise or winding direction whereby the spool 56 will be rotated in a counterclockwise or winding direction as appearing in FIGURE 10 so that one of the axial finger portions 93 and 94 will engage the actuating pin 104 on the cover plate 102 and thereby hold the drag control 82 against movement with the spool 56. As discussed above, the drag control 82 can be thusly moved into a variety of different position which produce varying amounts of drag by changing the combination of the drag members 75, 75a, 76 and 76a which can move into operative positions. After the desired drag condition is achieved by such rotation of the spool 56 with respect to the drag control 82, the hand crank 194 is then rotated in the counterclockwise direction a very small distance which causes one of the axial finger portions 93 and 94 to engage the actuating pin 104 in a clockwise direction, as appearing in FIGURE 10, and thereby to move the cover plate 102 back into the closed position. The reel is now ready for another casting operation with the different or changed drag applied to the brake mechanism 56 thereof. The casting operation can be initiated as before by first moving the lever 122 into its solid line position of FIGURE 12 and, thereafter, casting in a substantially conventional manner and as set forth above.

(8) Modifid drive mechanism

Figure 20:
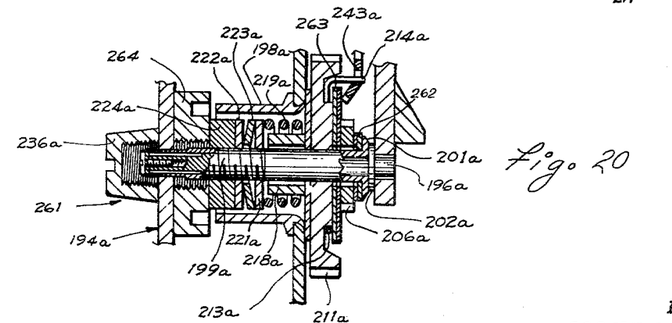
FIGURE 20 is a sectional view similar to the sectional view shown in FIGURE 17 and disclosing a modified construction.

As stated above in the preliminary comments of this application, some fishermen prefer to have a drive mechanism which is positively connected to the spool whenever the spool engaging clutch is operative. With this arrangement, rotation of the spool in either direction when the drive mechanism is connected to the spool, will effect a corresponding rotation of the hand crank, which is used to manually operate the drive mechanism. More specifically, and as shown in FIGURE 20, this desired end can be achieved by providing a drive mechanism 261 which is generally similar to the drive mechanism 193 except that the main gear 211a is drivingly connected to the drive shaft 199a and the drive pinion 206a is rotatably supported upon the drive shaft 199a. Accordingly, the drive pinion 206a is disposed between a pair of clutch disks 262 and 263 which by frictional engagement oppose relative rotation between the drive pinion 206a and the drive shaft 199a. The structure including the spindle 196a, the sleeve 198a, the flange 201a, the collar 202a, the washers 221a, 222a and 223a, the nonfrangible ring 224a, the collar 218a and the spring 219a may be substantially identical with the corresponding elements in the drive mechanism 193.

The star wheel 226 of the drive mechanism 193 is replaced, in this particular embodiment, by an internally threaded externally knurled nut 264 which serves substantially the same purpose as said star wheel 226. That is, by tightening the nut 264 upon the drive shaft 199a, compressive pressure is applied to the opposite sides of the drive pinion 206a, whereby the resistance to relative rotation between the drive pinion 206a and the drive shaft 199a is increased. The hand crank 194a and the cap 236a for holding said hand crank 194a upon the drive shaft 199a may also be the same as their counterparts in the drive mechanism 193. Likewise, the circular spring element 213a and its finger 214a, which engages the lock arm 243a, may be the same as their counterparts in said drive mechanism 193.

Thus, when the hand crank 194a is rotated in a direction effecting a winding rotation of the spool with which it is operably associated, the lock arm 243a is held out of engagement with the drive pinion 206a. However, when the main gear 211a is rotated in the opposite direction by the unwinding of the spool with which it is associated, the lock arm 243a is moved into engagement with the drive pinion 206a, thereby stopping rotation of the drive pinion 206a, and, through the frictional means associated therewith, also opposing rotation of the main gear 211a. However, if this resistance is overpowered, both the main gear 211a and the hand crank 194a, which are both rigidly connected to the drive shaft 199a, will be rotated in an unwinding direction. Then, if the fisherman wishes to prevent further unwinding motion, he can manually engage the hand crank 194a and hold it against such rotation, thereby having a positive control over the unwinding rotation of the spool to which the main gear 211a is connected.

Although particular preferred embodiments of the invention have been disclosed in detail above for illustrative purposes, it will be understood that variations or modifications of such disclosure, which lie within the scope of the appended claims, are fully contemplated.

What is claimed is:

1. In a fishing reel having a frame structure, a spool rotatably supported within said frame structure and manually operable drive means connectible to one end of said spool for rotating same, a shift and clutch assembly for connecting said drive means to said spool, comprising:
- a shift fork located radially of said spool adjacent the one end thereof, the outer end of said fork being pivotally supported upon said frame structure, and the inner end of the shift fork being adjacent said axis of said spool;
- a first clutch member secured to said one end of said spool and a second clutch member rotatably supported upon the inner end of the shift fork and movable therewith axially of said spool into and out of engagement with the first clutch member;
- a sideward projection on said shift fork between the inner and outer ends thereof and extending toward said spool;
- a V-shaped shift crank pivotally supported at its apex upon said frame structure for movement around a second axis parallel with the first-mentioned axis, one arm of said crank being movable into a shifted position of engagement with said projection for pivoting said shift fork away from said spool and thereby disengaging said clutch members;
- first resilient means operably connected to the other arm of said crank and to said frame structure for continuously urging said one arm away from said shifted position;
- second resilient means on the outer end of said shift fork continuously urging said fork toward said spool, whereby said clutch members are urged into engagement;
- manually operable means including a cam engageable with the other arm of said crank for pivoting same whereby said one arm is moved into said shifted position, and lock means on said cam; and
- cooperating surfaces on said lock means, said first resilient means, said cam and said other arm for releasably holding said crank in a position where said one arm is in said shifted position.

2. A fishing reel having a pair of spaced, coaxial and circular housings rigidly connected to each other and a spool rotatably supported upon and between said housings, comprising:
- a line guide and level wind means supporting same upon and between said housings for movement parallel with the axis of the spool, said line guide being movable around a pivot axis parallel with the spool axis into and out of an operating position;
- manually operable means movably mounted upon one of said housings for effecting pivotal movement of said line guide;
- manually operable drive means connected to said level wind means for effecting the axial movement of said line guide when it is in said operating position;
- gear and clutch means for connecting said drive means to said spool for effecting rotation thereof in one rotational direction when said drive means is operated;
- shift means, including a shift crank pivoted around an axis parallel with said spool axis, movable into a shifted position, in response to pivotal movement of said line guide into said operating position, for effecting engagement of said clutch means;
- cam means connected to said line guide and movable therewith around said pivot axis for moving said shift means out of said shifted position as said line guide is pivoted out of said operating position for effecting disengagement of said clutch means, said shift means being held out of said shifted position by said cam means;
- lock means on said cam and engaged with said shift crank and said drive means, when said line guide is out of its operating position, for holding said shift means out of said shifted position, operation of said drive means, whereby said spool is rotated in a winding direction when said clutch means is engaged, effecting said movement of said line guide into said operating position and effecting movement of said lock means out of engagement with said drive means, whereby said shift means is moved into said shifted position; and
- pawl means engageable with said gear means for obstructing rotation of said spool in an unwinding direction when said clutch means is engaged.

3. A fishing reel having a pair of spaced, coaxial and circular housings rigidly connected to each other and a spool rotatably supported upon and between said housings, comprising:
- a line guide and level wind means supporting same upon and between said housings for movement parallel with the axis of the spool, said line guide being pivotable about an axis parallel with the spool axis into and out of an operating position;
- manually operable means movably mounted upon one of said housings for effecting said pivotal movement of said line guide;
- manually operable drive means connected to said level wind means for effecting the axial movement of said line guide when it is in said operating position;
- gear and clutch means for connecting said drive means to said spool for effecting rotation thereof in one rotational direction when said drive means is operated;
- shift means movable into a shifted position, in response to pivotal movement of said line guide into said operating position, for effecting engagement of said clutch means, and for effecting disengagement of said clutch means as said line guide is pivoted out of said operating position, operation of said drive means and said gear means, whereby said spool is rotated in a winding direction when said clutch means is engaged, effecting movement of said line guide into said operating position and movement of said shift means out of said shifted position, whereby said clutch means is engaged;
- first pawl means engageable with said gear means for obstructing rotation of said spool in an unwinding direction when said clutch is engaged; and
- second pawl means movable with said line guide around said axis and engageable with said drive means for obstructing said axial movement of said line guide and holding said shift means out of said shifted position, whereby said clutch means is disengaged, until said spool is rotated by said gear means in said winding direction or said manually operable means is moved to pivot said line guide into its operating position.

4. In a fishing reel having a frame structure, a spool rotatably supported within said frame structure and manually operable drive means connectible to one end of said spool for rotating same, a shift and clutch assembly for connecting said drive means to said spool, comprising:
a shift fork located radially of said spool adjacent the one end thereof, the outer end of said fork being pivotally supported upon said frame structure, and the inner end of the shift fork being adjacent said axis of said spool;
a first clutch member secured to said one end of said spool and a second clutch member rotatably supported upon the inner end of the shift fork and movable therewith axially of said spool into and out of engagement with the first clutch member;
a sideward projection on said shift fork between the inner and outer ends thereof;
a shift crank pivotally supported upon said frame structure and having an arm movable into a shifted position of engagement with said projection for pivoting said shift fork away from said spool and thereby disengaging said clutch members;
first resilient means operably associated with said crank and said frame structure for continuously urging said arm away from said shifted position;
second resilient means continuously urging said clutch members into engagement;
manually operable means including a cam engageable with said crank for pivoting same whereby said arm is moved into said shifted position;
cooperating surfaces on said cam and said crank for releasably holding said crank in a position where said arm is in said shifted position;
a level wind mechanism having a driven shaft and a pinion rigidly secured thereto, said cam being adjacent to and pivotable about the rotational axis of said pinion;
manually engageable means connected to said cam for pivoting same; and
a pawl pivotally supported upon said cam and having tooth means engageable with said pinion for preventing rotation thereof with respect to said cam in one rotational direction, said pawl being engageable with said first resilient means for releasably holding said tooth means in engagement with said pinion when, and only when, said arm is in said shifted position.

5. In a fishing reel having a frame structure and a spool rotatably supported within said frame structure, a drive mechanism for said spool, comprising:
a spindle rigidly secured to said frame structure and extending axially beyond one end of the spool and parallel with the rotational axis thereof;
a hollow shaft rotatably supported upon said spindle;
a main gear rotatably and coaxially supported upon said shaft;
friction clutch means supported upon said shaft and engageable with said main gear for urging rotation of said main gear with said shaft;
manually operable control means mounted upon said shaft for adjusting the frictional engagement between said clutch means and said main gear;
a hand crank nonrotatably mounted upon said shaft for effecting rotation of said shaft with respect to said spindle;
gear means connected to said spool and drivingly engaged by said main gear;
a driving pinion nonrotatably mounted upon the hollow shaft near said main gear;
a pawl pivotally mounted upon said frame structure adjacent said main gear, said pawl having toothed means thereon engageable with the teeth on said pinion for preventing rotation of said pinion around said spindle in one rotational direction;
linkage means on said main gear and said pawl for moving said pawl into engagement with said pinion when said main gear is rotated around said spindle in said one rotational direction and for disengaging said pawl from said pinion when said main gear is rotated in the other rotational direction;
a second pinion pivotally supported upon said pawl and drivingly engageable with said main gear when said pawl is in engagement with said first mentioned pinion;
a ratchet wheel secured to and rotatable with said second pinion, said ratchet wheel having radial projections thereon; and
a resiliently flexible finger secured near one end to said pawl and engaged near the other end thereof with the periphery of said ratchet wheel, whereby rotation of said ratchet wheel in one direction causes said projections to move under said finger and produce an audible sound, such rotation of said ratchet wheel occurring when said second pinion is engaged by said pawl and said main gear is being rotated in said one direction.

6. In a fishing reel having a frame structure, a spool rotatably supported within said frame structure and manually operable drive means connectible to one end of said spool for rotating same, a shift and clutch assembly for connecting said drive means to said spool, comprising:
a shift fork located radially of said spool adjacent the one end thereof, the outer end of said fork being pivotally supported upon said frame structure, and the inner end of the shift fork being adjacent said axis of said spool;
a first clutch member secured to said one end of said spool and a second clutch member rotatably supported upon the inner end of the shift fork and movable therewith axially of said spool into and out of engagement with the first clutch member;
a sideward projection on said shift fork between the inner and outer ends thereof;
a shift crank pivotally supported upon said frame structure and having an arm movable into a shifted position of engagement with said projection for pivoting said shift fork away from said spool and thereby disengaging said clutch members;
first resilient means operably associated with said crank and said frame structure for continuously urging said arm away from said shifted position;
second resilient means continuously urging said clutch members into engagement;
manually operable means including a cam engageable with said crank for pivoting same whereby said arm is moved into said shifted position;
cooperating surfaces on said cam and said crank for releasably holding said crank in a position where said arm is in said shifted position;
a level wind mechanism having a driven shaft and a pinion rigidly secured thereto, said cam being adjacent to and pivoted about the rotational axis of said pinion;
manually engageable means connected to said cam for pivoting same; and
pawl means movably supported upon said cam and engageable with said pinion for preventing rotation thereof with respect to said cam in one rotational direction, said pawl means being engageable with said first resilient means for releasably holding said pawl means in engagement with said pinion when said arm is in said shifted position.

7. A fishing reel having a pair of spaced, coaxial and circular housings rigidly connected to each other and a spool rotatably supported upon and between said housings, comprising:
a line guide and level wind means supporting same upon and between said housings for movement parallel with the axis of the spool, said line guide being movable around a pivot axis parallel with the spool axis into and out of an operating position;
manually operable means movably mounted upon one of said housings for effecting pivotal movement of said line guide;
manually operable drive means connected to said level wind means for effecting the axial movement of said line guide when it is in said operating position;

gear and clutch means for connecting said drive means to said spool for effecting rotation thereof in one rotational direction when said drive means is operated;

shift means movable into a shifted position, in response to pivotal movement of said line guide into said operating position, for effecting engagement of said clutch means as said line guide is pivoted;

crank means connected to said line guide and movable therewith around said pivot axis for moving said shift means out of said shifted position as said line guide is pivoted out of said operating position for effecting disengagement of said clutch means, said shift means being held out of said shifted position by said crank means;

operation of said drive means and said gear means, whereby said spool is rotated in a winding direction when said clutch means is engaged, effecting said movement of said line guide and said crank around said axis whereby said shift means is moved into said shifted position;

pawl means engageable with said gear means for obstructing rotation of said spool in an unwinding direction when said clutch is engaged; and click means on said pawl means operable when said spool is rotated in an unwinding direction and said clutch means is engaged.

8. The structure of claim 2 including an adjustable friction clutch associated with said drive means for resisting in a variable amount the unwinding rotation of the spool when the clutch means is engaged.

References Cited in the file of this patent
UNITED STATES PATENTS

| | | |
|---|---|---|
| 1,345,072 | Case | June 29, 1920 |
| 1,939,148 | Spenny | Dec. 12, 1933 |
| 2,290,662 | Willison | July 21, 1942 |
| 2,354,530 | McMahon | July 25, 1944 |
| 2,536,583 | Tank | Jan. 2, 1951 |
| 2,578,477 | Hurd | Dec. 11, 1951 |
| 2,598,387 | Hunsicker | May 27, 1952 |
| 2,639,870 | Graham | May 26, 1953 |
| 2,652,212 | Holahan | Sept. 15, 1953 |
| 2,652,991 | Murvall | Sept. 22, 1953 |
| 2,686,016 | Kilian | Aug. 10, 1954 |
| 2,953,314 | Voll | Sept. 20, 1960 |
| 2,967,676 | Klingberg | Jan. 10, 1961 |